United States Patent
Ishida et al.

(10) Patent No.: US 9,291,768 B2
(45) Date of Patent: Mar. 22, 2016

(54) MULTICORE FIBER

(71) Applicant: FUJIKURA LTD., Tokyo (JP)

(72) Inventors: Itaru Ishida, Sakura (JP); Shoichiro Matsuo, Sakura (JP)

(73) Assignee: FUJIKURA LTD., Tokyo (JP)

(*) Notice: Subject to any disclaimer, the term of this patent is extended or adjusted under 35 U.S.C. 154(b) by 0 days.

(21) Appl. No.: 14/549,056

(22) Filed: Nov. 20, 2014

(65) Prior Publication Data
US 2015/0147039 A1    May 28, 2015

(30) Foreign Application Priority Data
Nov. 25, 2013 (JP) .................. 2013-243281

(51) Int. Cl.
*G02B 6/02* (2006.01)
*G02B 6/036* (2006.01)

(52) U.S. Cl.
CPC ........ *G02B 6/02042* (2013.01); *G02B 6/03633* (2013.01)

(58) Field of Classification Search
CPC ............... G02B 6/0288; G02B 6/0281; G02B 6/03644; G02B 6/03627; G02B 6/03611; G02B 6/02042
USPC .................................. 385/124, 126
See application file for complete search history.

(56) References Cited

U.S. PATENT DOCUMENTS

2012/0230640 A1*  9/2012  Hayashi ................. 385/126

FOREIGN PATENT DOCUMENTS

| EP | 2 682 793 A1 | 1/2014 |
| EP | 2 806 297 A1 | 11/2014 |
| JP | 10-104443 A | 4/1998 |
| WO | 2012/118132 A1 | 9/2012 |
| WO | 2013/108523 A1 | 7/2013 |

OTHER PUBLICATIONS

Office Action dated Jun. 23, 2015, issued in counterpart Japanese application No. 2013-243281 (w/English translation) (9 pages).
Y. Kokubun et al. "Heterogeneous uncoupled and homogeneous coupled multicore fibers," 2009, pp. 42-43 cited in Japanese Office Action dated Jun. 23, 2015.

* cited by examiner

*Primary Examiner* — Jerry Blevins
(74) *Attorney, Agent, or Firm* — Westerman, Hattori, Daniels & Adrian, LLP

(57) ABSTRACT

A multicore fiber according to an aspect of the present invention includes a plurality of cores and a cladding surrounding the plurality of the cores. In this multicore fiber, a pair of cores is arranged and disposed on a linear line passed through the center of the cladding, the pair of the cores being adjacent to each other and having refractive indexes varied differently from the cladding to the cores.

7 Claims, 5 Drawing Sheets

MULTICORE FIBER

BACKGROUND OF THE INVENTION

The present invention relates to a multicore fiber, and is preferred to the case where the crosstalk between cores is reduced.

Presently, an optical fiber for use in a popular optical fiber communication system has a structure in which a single core is surrounded by a cladding, an optical signal is propagated through the inside of the core, and information is transmitted.

In the optical fiber communication system in these years, a large number of optical fibers ranging from a few tens to a few hundreds optical fibers are used, and a volume of information transmitted is dramatically increasing. In order to reduce the number of optical fibers in such an optical fiber communication system, such a multicore fiber is proposed in which a plurality of cores is surrounded by a cladding.

For example, Patent Document 1 proposes a multicore fiber in a structure in which a plurality of cores is arranged side by side on a single linear line and these cores are entirely enclosed with a cladding.

[Patent Document 1] JP-A-10-104443

SUMMARY OF THE INVENTION

Meanwhile, in the multicore fiber described in Patent Document 1, since the distance between the center axes of cores adjacent to each other (the pitch between cores) is set to a length of 20 µm, a matter of concern is the crosstalk between the cores.

On the other hand, the outer diameter of the multicore fiber is increased in the direction in which the plurality of cores is arranged on the linear line as the distance between the center axes of the cores adjacent to each other (the pitch between the cores) is increased, and the multicore fiber is upsized.

Therefore, it is an object of the present invention to provide a multicore fiber that can reduce the crosstalk between cores while suppressing an increase in the outer diameter of the multicore fiber.

To achieve the above object, the present invention provides a multicore fiber including: a plurality of cores; and a cladding surrounding the plurality of cores, wherein a pair of cores is arranged and disposed on a linear line passed through a center of the cladding, the pair of the cores being adjacent to each other and having refractive indexes varied differently from the cladding to the cores.

In this pair of the cores, the refractive indexes are varied differently from the cladding to the cores, so that crosstalk can be reduced even though the distance between the center axes of the cores is shortened, as compared with the case where cores in which refractive indexes are similarly varied are arranged adjacent to each other. Thus, in accordance with the multicore fiber according to an aspect of the present invention, it is possible to reduce the crosstalk between the cores while suppressing an increase in the outer diameter of the multicore fiber.

In the case where the refractive indexes are varied differently from the cladding to the cores in the pair of the cores adjacent to each other, such a structure can be adopted in which one of the pair of the cores is surrounded by an inner cladding layer having an average refractive index lower than an average refractive index of the one core; the inner cladding layer is surrounded by a trench layer having an average refractive index lower than the average refractive index of the inner cladding layer; and the inner cladding layer and the trench layer are not provided between the other of the pair of the cores and the cladding.

Moreover, such a structure can be adopted in which the pair of the cores has almost same mode field diameters; and the average refractive index of the one core is higher than the average refractive index of the other core.

It is noted that preferably, the one core and the other core are alternately disposed. In the case where this configuration is provided, the distance between the center axes of the cores can be much further reduced while reducing the crosstalk between the cores adjacent to each other, as compared with the case where the one core and the other core are not alternately disposed.

Furthermore, it is preferable that the one core is a pair of outer cores located on an outermost side, and the other core is inner cores sandwiched between the pair of the outer cores. In the case where this configuration is provided, the crosstalk between the cores can be suppressed while reducing the influence of disturbance on the cores.

Furthermore, it is preferable that a number of the inner cores is two or greater, and a distance between center axes of the inner cores adjacent to each other is greater than a distance between center axes of the outer core and the inner core located adjacent to the outer core.

In the case where this configuration is provided, the thickness of the multicore fiber can be reduced while suppressing the crosstalk between the inner cores, as compared with the case where the distance between the center axes of the inner cores adjacent to each other is almost the same as the distance between the center axes of the outer core and the inner core located adjacent to the outer core.

As described above, according to an aspect of the present invention, there is provided a multicore fiber that can reduce the crosstalk between cores while suppressing an increase in the outer diameter of the multicore fiber.

DETAILED DESCRIPTION OF THE INVENTION

In the following, preferred embodiments for implementing the present invention will be described in detail with reference to the drawings.

1. First Embodiment

Figure 1:
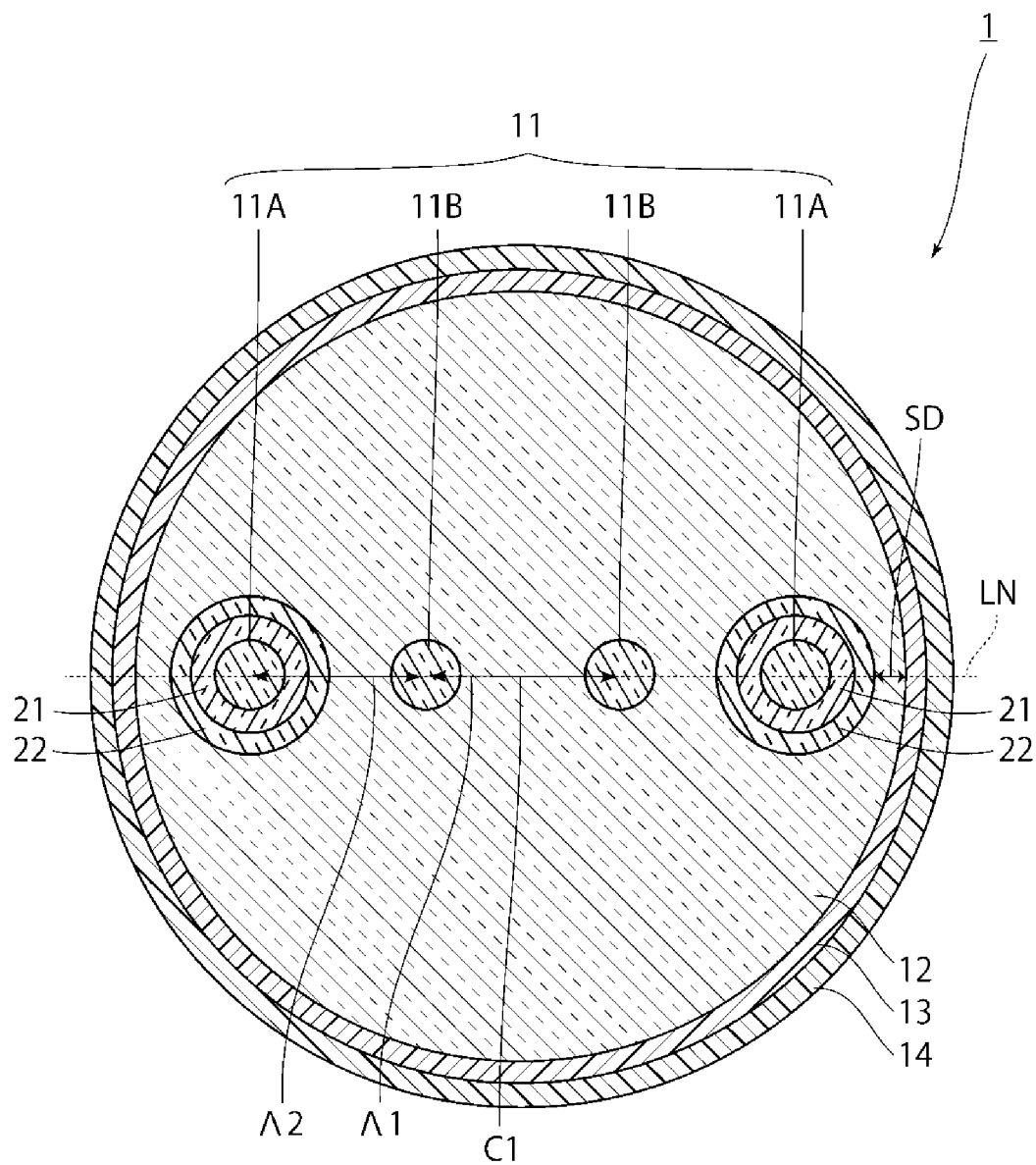
FIG. 1 is diagram of a cross section perpendicular to the longitudinal direction of a multicore fiber according to a first embodiment.

FIG. 1 is diagram of a cross section perpendicular to the longitudinal direction of a multicore fiber 1 according to a first embodiment. As illustrated in FIG. 1, the multicore fiber 1 according to the embodiment includes a plurality of cores 11, a cladding 12 that encloses the plurality of cores 11, a first protective layer 13 that encloses the cladding 12, and a second protective layer 14 that encloses the first protective layer 13 as main components.

The plurality of cores 11 is arranged and disposed on a linear line LN passed through a center C1 of the cladding 12, and includes a pair of outer cores 11A located on the outermost side and inner cores 11B sandwiched between the pair of the outer cores 11A.

In the case of the embodiment, the outer core 11A is surrounded by an inner cladding layer 21, and the inner cladding layer 21 is surrounded by the trench layer 22. On the other hand, two inner cores 11B are provided, and a distance $\Lambda 1$ between the center axes of the inner cores adjacent to each other is greater than a distance $\Lambda 2$ between the center axes of the outer core 11A and the inner core 11B located adjacent to the outer core 11A.

Moreover, the difference in the cutoff wavelength between the outer core 11A and the inner core 11B located adjacent to the outer core 11A is a wavelength of 100 nm or less, and a shortest distance SD between the outer circumferential surface of the trench layer 22 and the outer circumferential surface of the cladding 12 is a length ranging between 15 μm or greater and 62.5 μm or less.

It is noted that in FIG. 1, the centers of the cores 11 are located on the linear line LN passed through the center C1 of the cladding 12. However, it may be fine that the centers of the cores 11 are located at positions displaced from the linear line passed through the center C1 of the cladding 12 as long as the cores 11 are arranged and disposed on the linear line LN.

Figure 2:
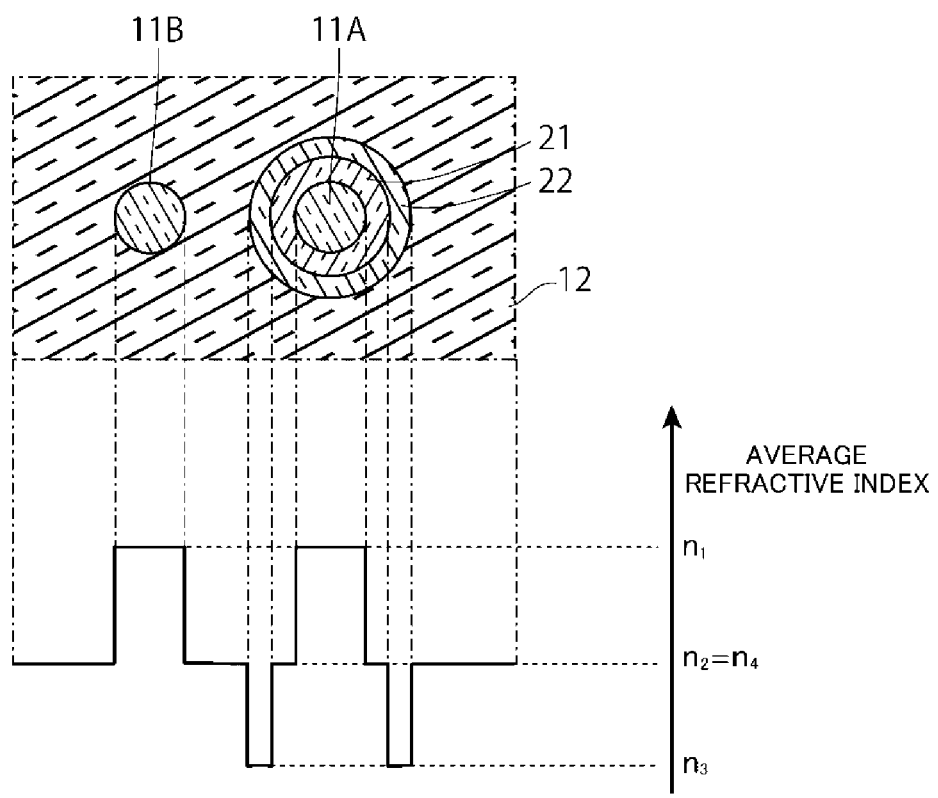
FIG. 2 is a diagram of a refractive index profile in a cladding.

FIG. 2 is a diagram of a refractive index profile in the cladding 12. As illustrated in FIG. 2, the outer core 11A is surrounded by the inner cladding layer 21 having an average refractive index $n_2$ lower than an average refractive index $n_1$ of the outer core 11A. The inner cladding layer 21 is surrounded by the trench layer 22 having an average refractive index $n_3$ lower than the average refractive index $n_2$ of the inner cladding layer 21 and an average refractive index $n_4$ of the cladding 12.

For example, the outer core 11A is formed of silica doped with a dopant such as germanium that increases the average refractive index, and the cladding 12 is formed of pure silica. Moreover, the inner cladding layer 21 is formed of silica doped with a dopant in the amount smaller than the amount of the dopant of the outer core 11A, and the trench layer 22 is formed of silica doped with a dopant such as fluorine that reduces the average refractive index.

An average refractive index $n_1$ of the inner core 11B is almost the same as the average refractive index $n_1$ of the outer core 11A, and the inner cladding layer 21 and the trench layer 22 are not disposed between the inner core 11B and the cladding 12.

As described above, among a set of the cores 11 adjacent to each other, the refractive indexes are varied differently from the cladding 12 to the core 11 in a pair of the outer core 11A and the inner core 11B located adjacent to the outer core 11A.

It is noted that in FIG. 2, the average refractive index $n_2$ of the inner cladding layer 21 is almost the same as the average refractive index $n_4$ of the cladding 12. However, it may be fine that the average refractive index $n_2$ of the inner cladding layer 21 is higher or lower than the average refractive index $n_4$ of the cladding 12.

In the multicore fiber 1 described above, pairs of the cores 11A and 11B adjacent to each other and having refractive indexes varied differently from the cladding 12 to the core 11 are arranged and disposed on the linear line passed through the center C1 of the cladding 12.

On this account, the crosstalk between a pair of the cores 11A and 11B can be reduced even though the distance $\Lambda 2$ between the center axes of this pair of the cores 11A and 11B is smaller than the distance $\Lambda 1$ between the center axes of the cores 11B whose refractive indexes are similarly varied from the cladding 12 to the core 11. Thus, in the multicore fiber 1 according to the embodiment, the crosstalk between the cores can be reduced while suppressing an increase in the outer diameter of the multicore fiber 1.

Moreover, one of a pair of the cores is the outer core 11A located on the outermost side, and the other of the pair is the inner core 11B, so that the crosstalk between the cores can be suppressed while reducing the influence of disturbance on the cores 11.

Meanwhile, in the case of the embodiment, two inner cores 11B are provided, and the distance $\Lambda 1$ between the center axes of the inner cores adjacent to each other is greater than the distance $\Lambda 2$ between the center axes of the outer core 11A and the inner core 11B located adjacent to the outer core 11A. On this account, the shortest distance SD can be made smaller while suppressing the crosstalk between the inner cores 11B, as compared with the case where the distance $\Lambda 1$ between the center axes of the inner cores 11B is almost the same as the distance $\Lambda 2$.

Moreover, the distances $\Lambda 1$ and $\Lambda 2$ between the center axes are set to a length of 24 μm or greater, so that the crosstalk between the cores adjacent to each other can be effectively suppressed. The distances $\Lambda 1$ and $\Lambda 2$ between the center axes are set to a length of 35 μm or less, so that an increase in the outer diameter of the multicore fiber 1 can be suppressed.

Furthermore, in the case of the embodiment, the shortest distance SD between the outer circumferential surface of the trench layer 22 and the outer circumferential surface of the cladding 12 is set to a length ranging between 15 μm or greater and 62.5 μm or less, so that the thickness of the multicore fiber 1 can be reduced while effectively suppressing the influence of disturbance on the cores 11. It is noted that preferably, the shortest distance SD is a length ranging between 20 μm or greater and 35 μm or less.

In addition, in the case of the embodiment, the difference in the cutoff wavelength between the outer core 11A and the inner core 11B, between which the cutoff wavelength is most likely to be varied, is set to a wavelength of 100 nm or less. On this account, even though the length of the multicore fiber 1 is 1,000 m or less for the use of a short distance, the difference in the cutoff wavelength between all the cores adjacent to each other can be a wavelength of 100 nm or less among a plurality of the cores 11 surrounded by the cladding 12. Accordingly, it is possible to expand a communication waveband in which light can be propagated in a single mode, as compared with the case where the difference in the cutoff wavelength between the outer core 11A and the inner core 11B exceeds a wavelength of 100 nm.

Generally, in the case where the inner cladding layer 21 and the trench layer 22 are provided, the cutoff wavelength is likely to be long, as compared with the case where the inner cladding layer 21 and the trench layer 22 are not provided. Therefore, in order to set the difference in the cutoff wavelength between the outer core 11A and the inner core 11B to a wavelength of 100 nm or less, it is more desirable that the refractive index of the core, the diameter of the core, or both of the refractive index and diameter of the core be varied between the core 11A surrounded by the inner cladding layer 21 and the core 11B not surrounded by the inner cladding layer 21. More specifically, the relationship that the refractive index of the core 11A is smaller than the refractive index of the core 11B, the relationship that the diameter of the core 11A is smaller than the diameter of the core 11B, or both of the relationships are adopted, so that the cutoff wavelength can be further shortened.

2. Second Embodiment

Next, a second embodiment will be described in detail with reference to the drawings. However, in the components of a multicore fiber according to the second embodiment, the components the same as or equivalent to the components according to the first embodiment are designated the same reference numerals and signs, and the overlapping description is appropriately omitted.

Figure 3:
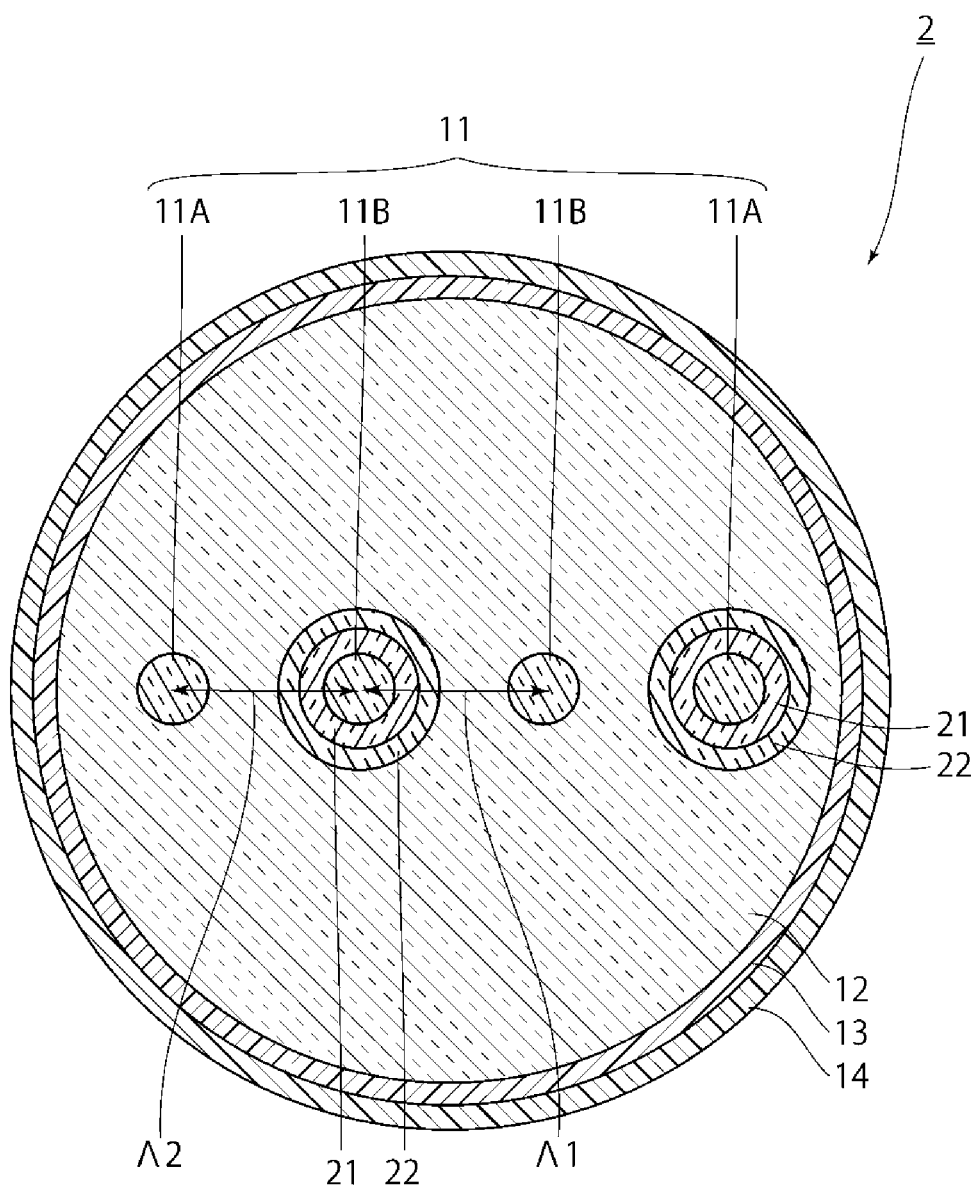
FIG. 3 is a cross sectional diagram perpendicular to the longitudinal direction of a multicore fiber according to a second embodiment.

FIG. 3 is a cross sectional diagram perpendicular to the longitudinal direction of a multicore fiber 2 according to the second embodiment. As illustrated in FIG. 3, in the multicore fiber 2 according to the embodiment, the layout of an inner cladding layer 21 and a trench layer 22 is different from the multicore fiber 1 according to the first embodiment.

In other words, in the multicore fiber 2 according to the embodiment, a core 11 around which the inner cladding layer 21 and the trench layer 22 are provided and a core 11 around which the inner cladding layer 21 and the trench layer 22 are not provided are alternately disposed.

It is noted that in the embodiment, the distance Λ1 between the center axes of the inner cores adjacent to each other is almost the same as the distance Λ2 between the center axes of an outer core 11A and an inner core 11B located adjacent to the outer core 11A.

According to the multicore fiber 2 described above, the distance between the center axes of the cores 11 can be much further reduced while reducing the crosstalk, as compared with the case of the first embodiment.

3. Third Embodiment

Next, a third embodiment will be described in detail with reference to the drawings. However, in the components of a multicore fiber according to the third embodiment, the components the same as or equivalent to the components according to the first embodiment are designated the same reference numerals and signs, and the overlapping description is appropriately omitted.

Figure 4:
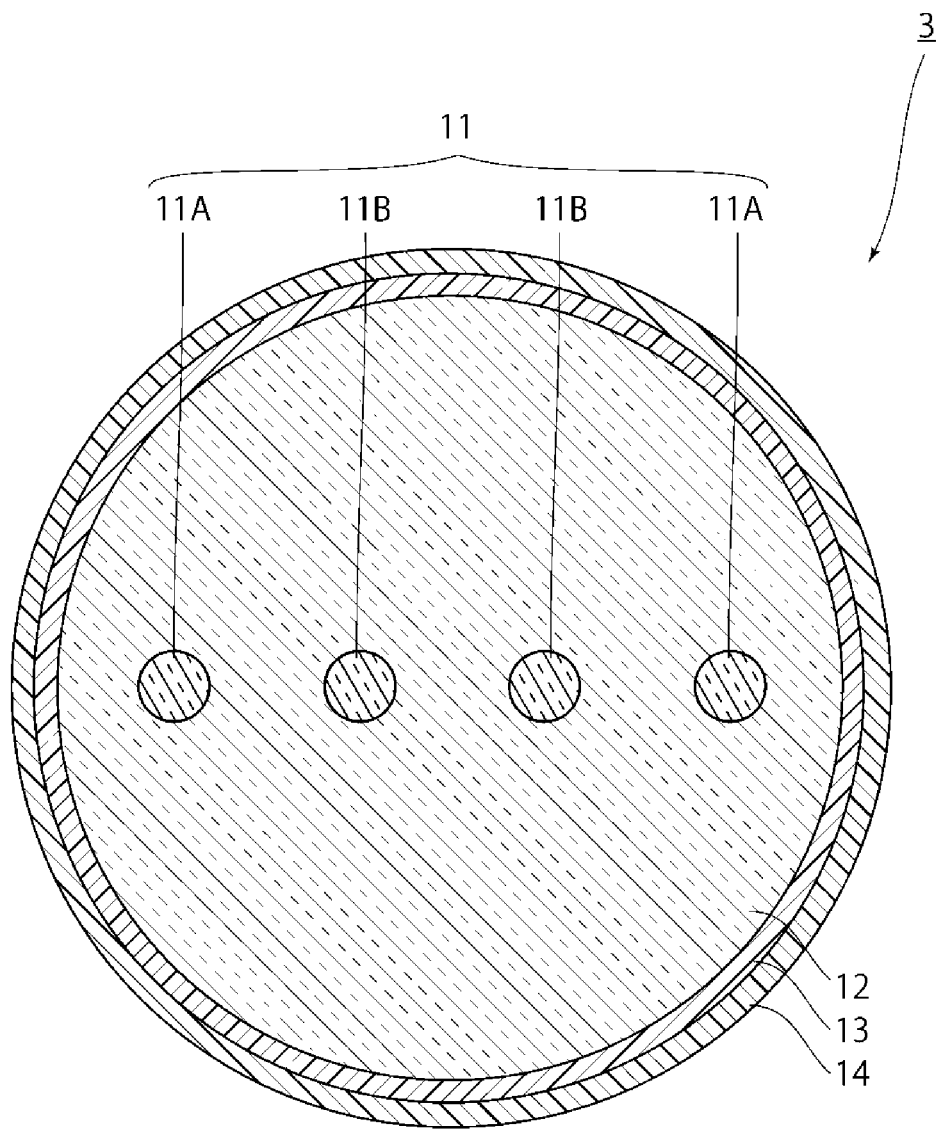
FIG. 4 is a cross sectional diagram perpendicular to the longitudinal direction of a multicore fiber according to a third embodiment.

FIG. 4 is a cross sectional diagram perpendicular to the longitudinal direction of a multicore fiber 3 according to the third embodiment. As illustrated in FIG. 4, the multicore fiber 3 according to the embodiment is different from the multicore fiber 2 according to the second embodiment in that the inner cladding layer 21 and the trench layer 22 are omitted and cores 11 whose average refractive indexes are different from each other are alternately disposed.

Figure 5:
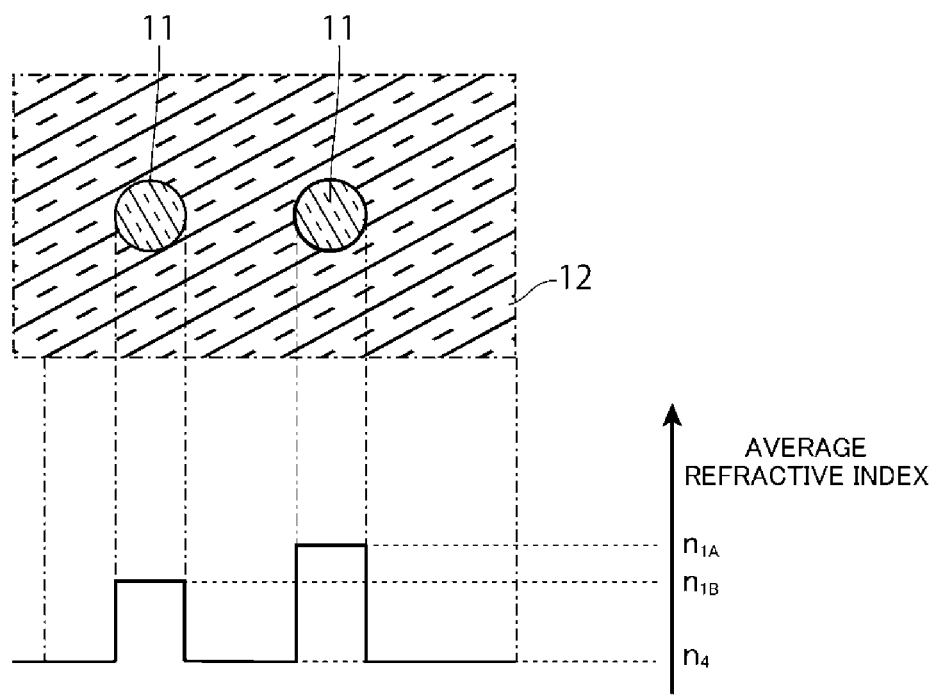
FIG. 5 is a diagram of a refractive index profile in a cladding according to the third embodiment.

FIG. 5 is a diagram of a refractive index profile in a cladding 12 according to the third embodiment. As illustrated in FIG. 5, an average refractive index $n_{1A}$ of one of the cores 11 adjacent to each other and an average refractive index $n_{1B}$ of the other of the cores 11 are lower than an average refractive index $n_4$ of the cladding 12. Moreover, the average refractive index $n_{1A}$ of one of the cores 11 is higher than the average refractive index $n_{1B}$ of the other of the cores 11.

For example, the core 11 having the average refractive index $n_{1A}$ is formed of silica doped with a dopant such as germanium that increases the average refractive index, the core 11 having the average refractive index $n_{1B}$ is formed of silica doped with a dopant in the amount smaller than the amount of the dopant of the core 11, and the cladding 12 is formed of pure silica.

As described above, in the embodiment, the core 11 having the average refractive index $n_{1A}$ and the core 11 having the average refractive index $n_{1B}$ lower than the average refractive index $n_{1A}$ are alternately disposed. For example, in FIG. 4, the outer core 11A on the leftmost side is the core 11 having the average refractive index $n_{1A}$, and the inner core 11B on the second leftmost side is the core 11 having the average refractive index $n_{1B}$. Moreover, the inner core 11B on the third leftmost side is the core 11 having the average refractive index $n_{1A}$, and the outer core 11A on the fourth leftmost side is the core 11 having the average refractive index $n_{1B}$. It is noted that the mode field diameters of these cores 11 are almost the same.

It is noted that it is fine that the diameters of the cores are adjusted in order to provide different refractive indexes and almost the same mode field diameters between the cores 11 adjacent to each other. More specifically, the diameter of the core 11 having the average refractive index $n_{1A}$ is made greater than the diameter of the core 11 having the average refractive index $n_{1B}$.

In the multicore fiber 3 described above, a difference is provided for the average refractive indexes of the cores 11 adjacent to each other, and the refractive indexes are varied differently from the cladding 12 to the cores 11.

In the case where this configuration is provided, similarly to the case of the first embodiment, it is possible to reduce the crosstalk between the cores while suppressing an increase in the outer diameter of the multicore fiber 3.

It is noted that in the embodiment, the core 11 having the average refractive index $n_{1A}$ and the core 11 having the average refractive index $n_{1B}$ lower than the average refractive index $n_{1A}$ are alternately provided. However, it may be fine that in the first embodiment, the inner cladding layer 21 and the trench layer 22 are omitted, the core 11 having the average refractive index $n_{1A}$ is the outer core 11A, and the core 11 having the average refractive index $n_{1B}$ is the inner core 11B. Also with this configuration, the effect similar to the third embodiment can be obtained.

4. Exemplary Modification

In the foregoing embodiments, the number of the inner cores 11B is two. However, the number of the inner cores 11B may be one, or may be three or greater. It is noted that in the case where the number of the inner cores 11B is two or greater, the distance Λ1 between the center axes of the inner cores 11B adjacent to each other may be almost the same as the distance Λ2 between the center axes of the outer core 11A and the inner core 11B located adjacent to the outer core 11A. However, in the case where the thickness of the multicore fiber is reduced while suppressing the crosstalk between the inner cores 11B, it is preferable that the distance Λ1 be greater than the distance Λ2, as described above.

The multicore fiber according to the present invention can be appropriately combined, omitted, modified, and added with publicly known techniques, for example, without deviating from the object of the present application, other than the content described above.

The invention claimed is:
1. A multicore fiber comprising:
   a plurality of cores; and
   a cladding surrounding the plurality of cores,
   wherein a pair of cores is arranged and disposed on a linear line passed through a center of the cladding, the pair of the cores being adjacent to each other and having refractive indexes varied differently from the cladding to the cores, wherein one of the pair of the cores is surrounded by an inner cladding layer having an average refractive index lower than an average refractive index of the one core, the inner cladding layer is surrounded by a trench layer having an average refractive index lower than the average refractive index of the inner cladding layer, and the inner cladding layer and the trench layer are not provided between the other of the pair of the cores and the cladding.

2. The multicore fiber according to claim 1, wherein the one core and the other core are alternately disposed.

3. The multicore fiber according to claim 1, wherein the one core is a pair of outer cores located on an outermost side, and the other core is an inner core sandwiched between the pair of the outer cores.

4. The multicore fiber according to claim 3, wherein a number of the inner core is two or greater, and a distance between center axes of the inner cores adjacent to each other is greater than a distance between center axes of the outer core and the inner core located adjacent to the outer core.

5. A multicore fiber comprising:

a plurality of cores; and a cladding surrounding the plurality of cores, wherein a pair of cores is arranged and disposed on a linear line passed through a center of the cladding, the pair of the cores being adjacent to each other and having refractive indexes varied differently from the cladding to the cores, wherein the pair of the cores has almost same mode field diameters, and an average refractive index of one core of the pair of cores is higher than an average refractive index of the other core of the pair of cores, wherein the one core is a pair of outer cores located on an outermost side, and the other core is an inner core sandwiched between the pair of the outer cores, wherein a number of the inner cores is two or greater, and a distance between center axes of the inner cores adjacent to each other is greater than a distance between center axes of the outer core and the inner core located adjacent to the outer core.

6. A multicore fiber comprising:

a plurality of cores; and a cladding surrounding the plurality of cores, wherein a pair of cores is arranged and disposed on a linear line passed through a center of the cladding, the pair of the cores being adjacent to each other and having refractive indexes varied differently from the cladding to the cores, wherein the pair of the cores has almost same mode field diameters, and an average refractive index of one core of the pair of cores is higher than an average refractive index of the other core of the pair of cores, wherein the one core is a pair of outer cores located on an outermost side of the cladding, and the other core is an inner core sandwiched between the pair of the outer cores.

7. The multicore fiber according to claim 6, wherein the one cores is surrounded by an inner cladding layer having an average refractive index lower than an average refractive index of the one core and lower than a refractive index of the cladding, and the inner cladding layer is not provided between the other core and the cladding.

\* \* \* \* \*